Patented Feb. 23, 1943

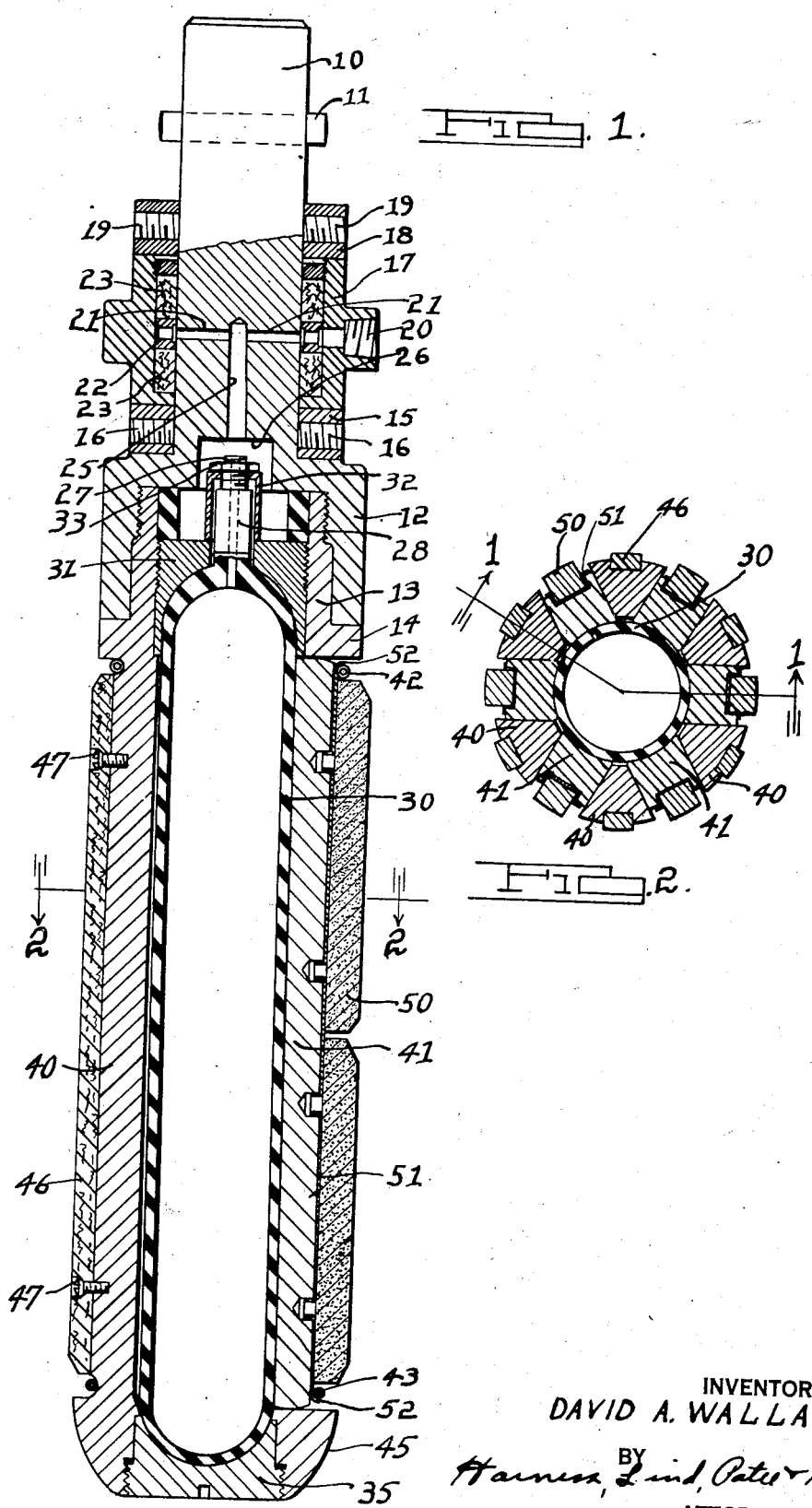

2,312,012

UNITED STATES PATENT OFFICE 2,312,012

EXPANSIBLE HONE

David A. Wallace, Detroit, Mich., assignor to Chrysler Corporation, Highland Park, Mich., a corporation of Delaware Application August 26, 1940, Serial No. 354,179

1 Claim. (Cl. 51—184.1)

My present invention relates to expansible hones for finishing the surfaces of cylindrical bores. It is the principal object of the present invention to provide an improved expansible hone, the parts of which are relatively simple and readily removable so as to make the substitution and interchangeability of parts convenient so that the structure may be quickly changed from one type of operating characteristics to another.

The present invention comprises a rigid, substantially cylindrical cage member formed of end pieces connected by integral vertical bars which form a substantially cylindrical cage. The adjacent surfaces of adjacent bars are so formed as to be substantially parallel to radii of the cylindrical member so as to form guiding surfaces for guiding movable tool holding members radially with respect to the cylindrical member. Radial movement of the tool holding members is accomplished by pneumatic or hydraulic pressure applied to the interior of a fluid-impervious bag suspended between the end pieces and inside of the vertical bars, so that substantially equal pressure is applied simultaneously throughout the length of the plurality of tool holding bars when desired. The simplicity of manufacture and assembly of the present invention make it of greater utility than heretofore known expansible hones.

The present invention is an improvement upon the invention expressed in my copending application, Serial No. 265,109, filed March 31, 1939.

The objects and advantages of the present invention should be more readily apparent from the description of the accompanying specification and drawing wherein like numerals refer to like parts throughout.

In the drawing, Fig. 1 is a sectional view in elevation of an expansible hone constructed according to my present invention, the section being taken substantially along line 1—1 of Fig. 2; and Fig. 2 is a cross-section taken through the expansible hone substantially along line 2—2 of Fig. 1.

The assembly comprises a shank 10 having a crossbar 11 therethrough by means of which the shank may be engaged in a suitable chuck. The shank 10 is integral with a cup-shaped portion 12 of substantially increased diameter extending downward from its lower end, the lower portion of the flange thereof being smooth to provide a centering surface for engaging internal threads with the external threads at the upper end of a cage member 13 forming a part of the tool, which cage member is provided with an external flange 14 designed to engage the lower lip of the cup-shaped portion 12 and form a rigid, fluid-tight seal. The shoulder formed by the cup-shaped portion 12 is engaged by an annular collar 15 fastened to the shank 10 by convenient means such as set screws 16. Mounted upon the collar 15 is a fluid inlet collar 17 which is retained in position by an upper collar 18 fixed to the shank 10 by convenient means such as set screws 19. The inlet collar 17 is provided with a threaded mouth 20 to which may be affixed a pipe (not shown) for admitting fluid thereinto and which communicates with a plurality of openings 21 extending radially inward through the shank 10 through the medium of a perforated intermediate ring 22 held between the packings 23 of a packing gland mounted inside of the inlet collar 17. The construction provides a running gland whereby fluid may be forced into the interior of the shank 10 or withdrawn therefrom while the tool is rotating. Bores 21 communicate with a vertical bore 25 extending downward into a recess 26 in the top of the cup extension 12 of the shank 10 in which is located the upper end of a threaded tube 27 having its lower end vulcanized to a nipple 28 through which a central bore communicates with the interior of a fluid-impervious bag 30 suspended therefrom and lying within the central bore of the cage member 13. The upper end of the bag 30 is rounded and fits into the rounded surface of an end piece 31 threaded to engage with internal threads on the cage 13, the lower portion of the outer surface of the end piece 31 being of considerable length and engaging a similar smooth surface on the cage member 13 whereby to prevent the escape of fluid therebetween, just as fluid is prevented from escaping between the surfaces of the members 12 and 13. Between the upper surface of end piece 31 and the bottom of the cup-shaped extension 12 there is mounted a spacer 32 surrounding the nipple 28 and against which may be tightened a nut 33 engaging the threads of the tube 27 whereby the upper end of the bag 30 may be conveniently held in position with the opening thereinto in communication with the bore 25 in shank 10. The lower end of the bag 30 is also rounded and is held in position by a lower end piece 35 threaded into the lower end of the central bore of the cage member 13 and having an inner dished surface to match the rounded end of the bag 30.

The bag 30 is formed of a resilient fluid-impervious material, such as rubber, or a polymerized chloroprene which may be of advantage in certain installations where oil is likely to attack rubber, and preferably has sufficient rigidity to remain in contact with the walls of the central bore of the cage member 13 as illustrated in Figs. 1 and 2. In this position a slight amount of fluid pressure will begin to exert pressure against the inner surfaces of the vertical bars forming the cage member. Movable tool holder bars 41 are placed between the fixed bars 40, the two sets of bars being of substantial radial thickness so that the meeting surfaces of the fixed and movable bars guide the movable bars radially. The fixed bars 40 are preferably formed by cutting slots radially through the walls of the cylindrical member, the slots being preferably even in number so that a cutter may be employed which will pass diametrically through the cylindrical member, and the sides of the slots so formed are substantially parallel to radii of the cylindrical member so that substantially rectangular bars 41 may be guided therein for radial sliding movement. The result of so shaping the cylindrical member is to form the fixed bars 40 as substantially triangular members. Preferably the inwardly pointing apices of the fixed bars 40 are truncated and the corners thereof rounded outwardly so as not to have sharp corners likely to wear or cut the surface of the bag 30. Also, the inner surfaces of the rectangular bars 41 are preferably reentrantly rounded so as to fit the circumference of the bag 30 and provide better engagement therebetween, and likewise the inner edges of the bars 41 are preferably rounded so as to eliminate cutting or abrading edges.

The longitudinally extending fixed bars 40 form a cage between which the longitudinally extending movable bars 41 are retained in retracted position by suitable means such as garter springs 42 and 43 mounted at top and bottom, respectively, of the cage member and engaging the ends of the movable bars so as to hold them in retracted position between the fixed bars. Admission of fluid under pressure such as air, inert gases, or any suitable liquid such as oil or water, causes the vertical wall of the bag 30 to expand simultaneously and equally in all directions wherever permitted by the nature of the tool, thus causing the movable bars to slide radially outward equally and simultaneously throughout their length. Any stretching of the material of the bag necessary to accommodate such outward bulging of the walls thereof is permitted due to the fact that the bag is attached at its upper end only and the lower end may shift in its seat in end piece 35. The fluid pressure overcomes the retractive forces of the springs 42 and 43 and permits the movable bars 41 to move outward.

When the fluid pressure is released, or if suction is applied to the interior of the bag 30, the springs 42 and 43 will retract the movable bars thus decreasing the effective diameter of the tool so that it may be inserted within a cylindrical bore. In order that the tool itself may not cause vertical abrasions within the bore while it is being inserted or withdrawn, the lower end of the cage member 13 is rounded as shown at 45 and the fixed bars 40 are provided with protruding vertical strips 46 of cushioning material, such as leather, held in place thereon by screws 47. The effective diameter of the vertical strips 46 is preferably slightly less than that of the cylindrical bore which is being operated upon, and the lower ends of the strips 46 are preferably bevelled to an effective diameter lesser than the largest diameter of the surface 45 so as to permit ready insertion of the tool into the bore.

Each of the movable bars 41 is provided with an abrading tool or tools 50 which are mounted upon metal strips 51 suitably fastened to the bars 41, and the ends of which are preferably bent outward as at 52 so as to provide hooks for engaging the garter springs 42 and 43. When the movable bars are retracted the abrading tools are preferably extended to a lesser extent than the surfaces of the leather strips 46 so that longitudinal marks, such as might be caused by inserting and withdrawing the tool when the fluid pressure is released, may not be formed on the surface of the work. After the tool is positioned fluid pressure forces the abrading members 50 outward so that the effective diameter of the tool becomes greater than the diameter of the leather guiding strips. The abrading tools may be formed of natural or artificial stone or similar substances used for surface finishing various types of work pieces, and various grades of abrasive may be quickly interchanged by disengaging the springs 42 and 43 from the hooks 52 and withdrawing the movable bars 41.

Having described a preferred embodiment of my present invention, it should be apparent to those skilled in the art that the same permits of modifications in detail and arrangement. All such modifications as come within the scope of the following claim are considered to be a part of my invention.

I claim:

An expansible hone comprising a substantially cylindrical member having a relatively thick wall through which a plurality of longitudinally extending radial slots extend and a central, longitudinally extending bore, the sides of said slots being substantially parallel to radii of said member whereby the cross-section of each of the fixed bars extending longitudinally between slots is substantially trunco-pyramidal with the truncated end extending inward, substantially rectangular, longitudinally extending tool holder bars movably mounted in said slots and guided by the sides thereof for radial movement, surface finishing tools carried by said tool holder bars, resilient means carried by said member and retaining said tool holder bars in said slots, a fluid-expansible bag in said central bore and having a fluid transmitting opening thereinto whereby fluid pressure may be exerted against the interior surface of said bag in order to expand the same into said slots and force said tool holder bars radially outward against the restraint of said resilient means, and strips of cushioning material mounted on the outer surfaces of the fixed bars between said slots at an effective diameter greater than the effective diameter of said surface finishing tools when said tool holder bars have been retracted by said resilient means and lesser than the effective diameter of said surface finishing tools when said tool holder bars have been forced outward by said fluid-expansible bag, said cylindrical member having a rounded lower end by means of which the hone may be guided into a bore to be finished, and said strips having their lower extremities adjacent to, and at an effective diameter lesser than the greatest diameter of, said rounded lower end.

DAVID A. WALLACE.